(No Model.) 2 Sheets—Sheet 1.

W. C. MACKINNEY.
FRICTION CLUTCH.

No. 466,611. Patented Jan. 5, 1892.

Witnesses:
R. Schleicher.
A. V. Groups.

Inventor:
William C. Mackinney
by his Attorneys
Howson & Howson.

THE NORRIS PETERS CO., PHOTO-LITHO., WASHINGTON, D. C.

(No Model.) 2 Sheets—Sheet 2.
W. C. MACKINNEY.
FRICTION CLUTCH.
No. 466,611. Patented Jan. 5, 1892.
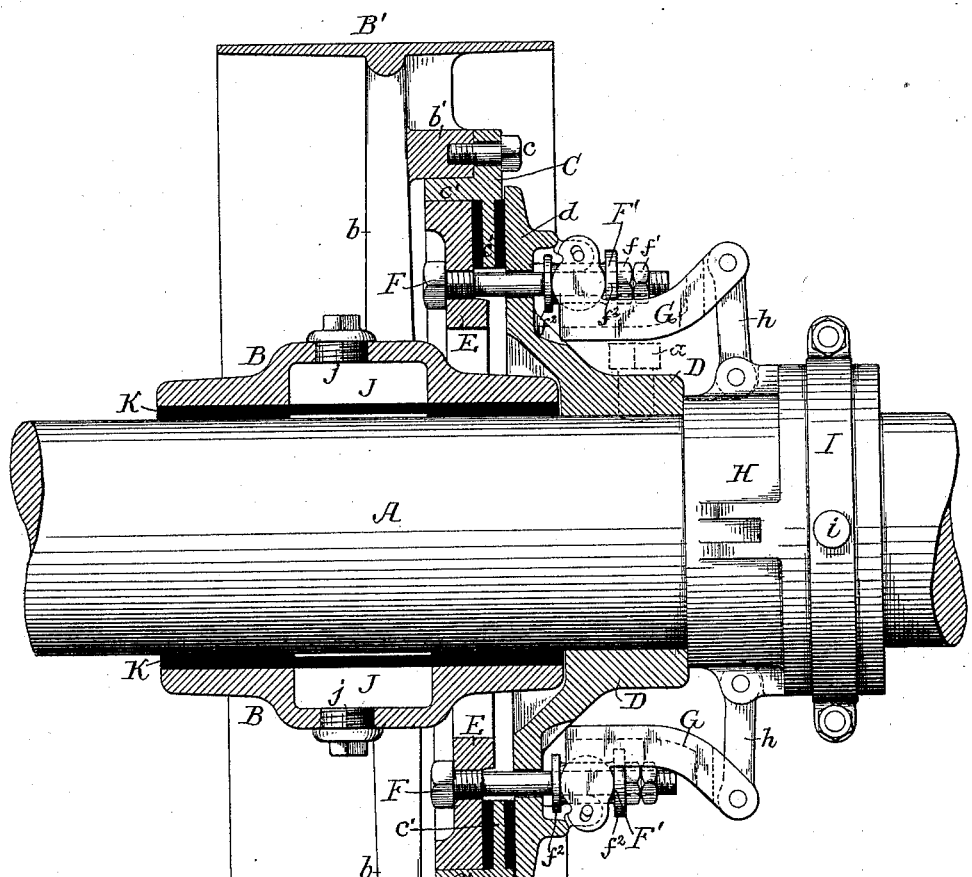
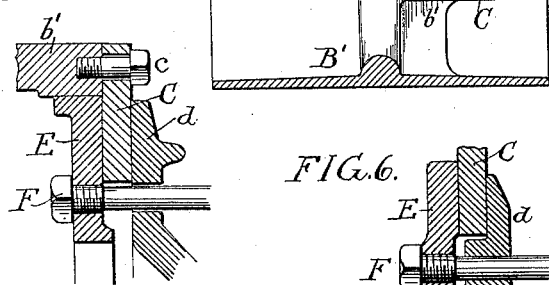
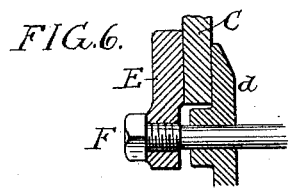
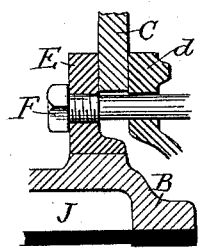
Witnesses:
R. Schleicher,
A. V. Groupé.
Inventor:
William C. MacKinney
by his Attorneys
Howson & Howson

UNITED STATES PATENT OFFICE.

WILLIAM C. MACKINNEY, OF PHILADELPHIA, PENNSYLVANIA, ASSIGNOR TO THE H. W. BUTTERWORTH & SONS COMPANY, OF SAME PLACE.

FRICTION-CLUTCH.

SPECIFICATION forming part of Letters Patent No. 466,611, dated January 5, 1892.

Application filed May 14, 1891. Serial No. 392,668. (No model.)

*To all whom it may concern:*

Be it known that I, WILLIAM C. MACKINNEY, a citizen of the United States, and a resident of Philadelphia, Pennsylvania, have invented certain Improvements in Friction-Clutches, of which the following is a specification.

The object of my invention is to construct an improved friction-clutch which can be readily attached to or detached from a pulley or hub on the shaft and which can be readily operated as fully described hereinafter, reference being had to the accompanying drawings, in which—

Figure 1:
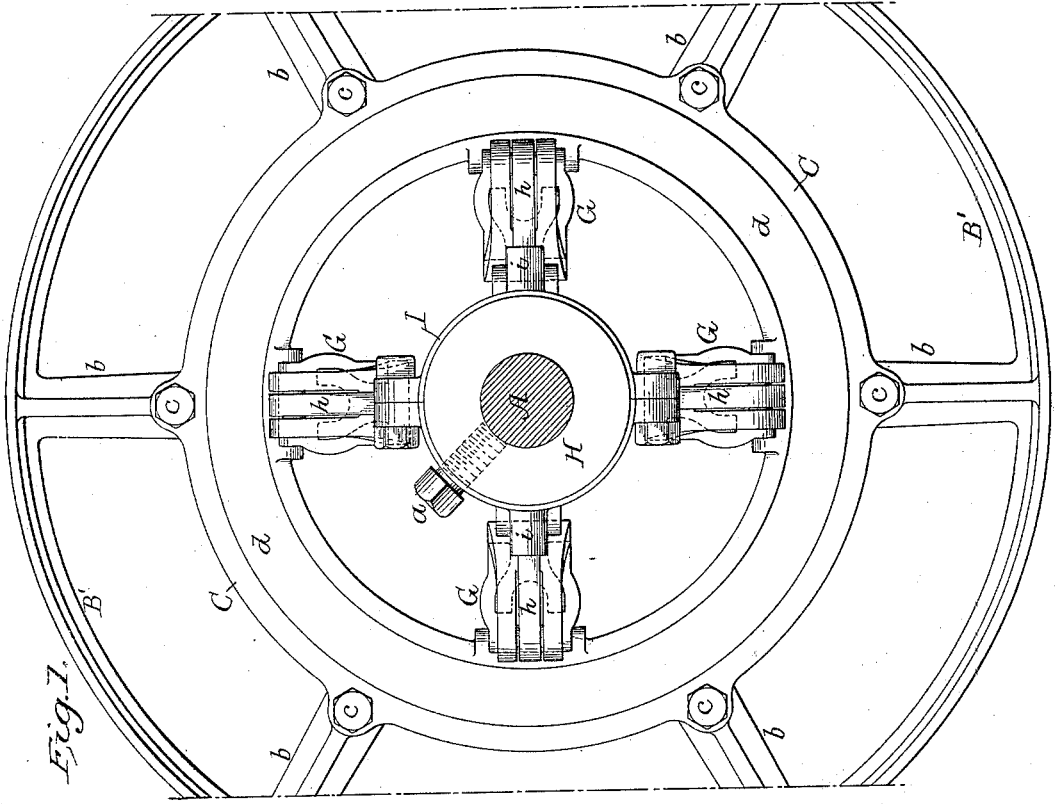
Figure 2:
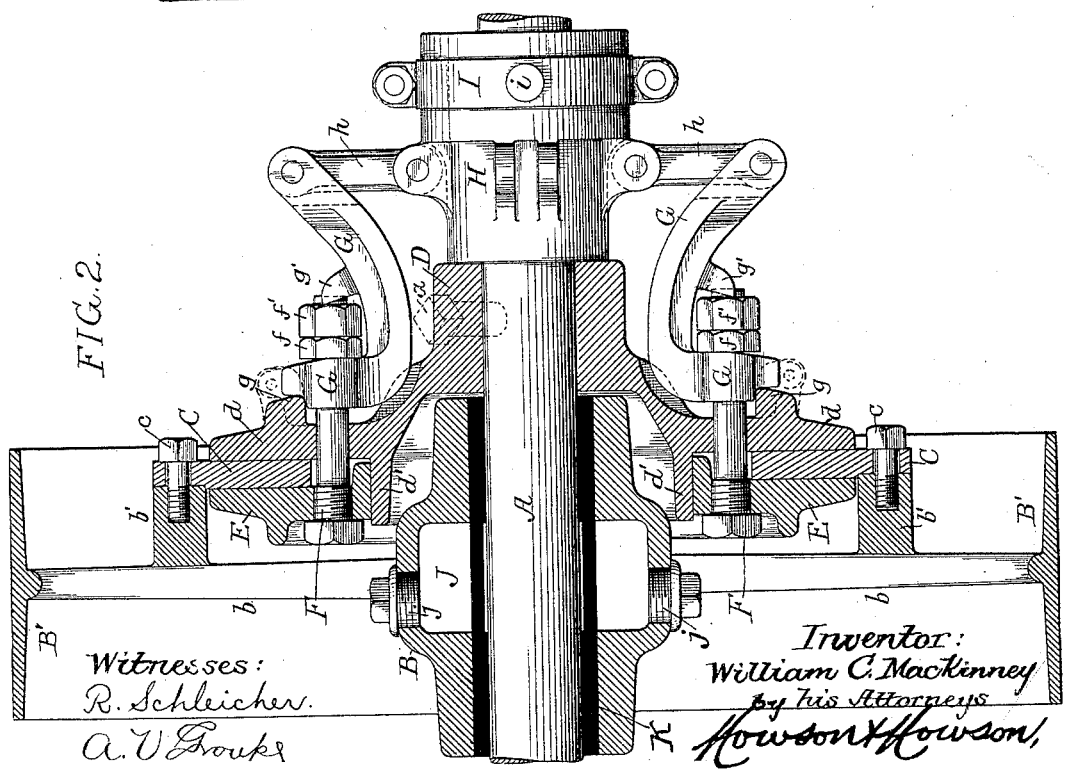

Figure 1 is a face view of my improved clutch, the shaft being in section. Fig. 2 is a transverse sectional view through the hub and part of the clutch. Fig. 3 is a sectional view showing a modified form of clutch; and Figs. 4, 5, and 6 are views of modifications of the bearing for the clutching-ring.

Referring to the drawings, A is the shaft, loose on which is a hub B, in the present instance forming part of a pulley B', although in some instances where two shafts are to be coupled together the hub may be fast on one shaft and form merely a bearing for the clutch-ring.

On the spokes $b$ is a series of lugs $b'$, to which is secured a clutch-ring C by screw-bolts $c$. This clutch-ring is shown plain in Fig. 2, but may have in some instances friction-faces $c'$ secured thereto, as shown in Fig. 3.

D is a sleeve fast to the shaft attached thereto by means of a set-screw $a$ or key, or both. This sleeve has a flange $d$, between which and a ring E is situated the clutch-ring C. This ring E, as shown in Fig. 2, slides on a projecting flange $d'$ on the sleeve D, the ring E being the clutching-ring, which is moved by mechanism which I will now proceed to describe.

Screwed into the ring E at a number of points—four in the present instance—are headed bolts F, having at their outer ends nuts $f$ and jam-nuts $f'$, and adapted to the bolt between the nut $f$ and the flange $d$ are levers G, having their fulcrums at $g$, the point being a projection on the flange $d$.

Each lever G is connected to a sliding collar H by links $h$, said collar being moved toward and from the sleeve D on the shaft by a yoke engaging with the pins $i$, mounted on the strap I of the collar or by any other means common to clutches of this class.

In some instances I form on each lever G a lug $g'$, which bears against the bolt or one of its nuts and acts to force the clutching-ring away from the ring C when it is desired to release the hub from the control of the shaft, and in some instances, instead of the lever G resting against the edge of the projection on the flange $d$, it may be pivoted thereto, as shown by dotted lines in Fig. 2.

In Fig. 3 I have shown the ring E as adapted to slide on a projecting flange $c'$ of the ring C, and in Fig. 4 I have shown the ring E guided by the lugs $b'$. In Fig. 5 I have shown the ring E adapted to slide on the hub B, and in Fig. 6 I have shown the ring E guided by the bolts F, which slide in bearings in the flange $d$ of the sleeve. Any of these modifications may be used without departing from my invention.

In Fig. 3 I have shown the levers G pivoted to ears on the flange $d$ of the sleeve D and adapted to collared nuts F' on the bolt F. These nuts have collars $f^2$ projecting on each side of the short arm of the lever.

The hub B in the present instance has a grease-reservoir J, and is provided with screw-plugs $j$, and between the shaft A and the hub is in the present instance a bushing K, which is perforated to allow the grease to gain access to the shaft. Thus it will be seen that a quantity of grease can be carried by the hub and be automatically fed to the bearing, as in most instances clutches of this character are in inaccessible places and during the greater portion of the time are turning with the shaft, so that it is impossible to oil the bearing without either first throwing the belt off or stopping the driving or counter shaft.

I claim as my invention—

1. The combination of the friction-ring secured to one part of the clutch, a sleeve D, having a flange adapted to one side of the friction-ring, a clutching-ring adapted to the opposite side of said ring, headed bolts having screw-threads at their heads adapted to screw-threads in the clutching-ring and screw-threads at their opposite ends, nuts on the said screw-threaded portion of the bolts, with levers situated between the nuts and the flange, and mechanism for operating said levers, substantially as and for the purpose described.

2. The combination of the friction-clutch, the shaft, the pulley loose on the shaft, projections on said pulley, a flat friction-ring secured to said projections by means of screws, a dished sleeve secured to the shaft and overlapping the hub, a flange on said sleeve adapted to one side of the friction-ring, a clutching-ring adapted to guides, so as to move parallel with the line of the shaft, bolts secured to and passing through the ring and through the flange, and levers acting on said bolts, with mechanism for operating said levers, substantially as described.

3. The combination, in a friction-clutch, of the hub, friction-ring thereon, a sleeve adapted to one side of the friction-ring, a clutching-ring adapted to the opposite side of said friction-ring, bolts passing through the clutching ring and sleeve, a nut on each bolt having flanges, with the levers adapted to the space between the flanges of the nuts, and mechanism for operating said levers, so that the clutching-ring will be under the control of the levers, substantially as described.

In testimony whereof I have signed my name to this specification in the presence of two subscribing witnesses.

WILLIAM C. MACKINNEY.

Witnesses:
JAMES F. HAGEN,
EUGENE ELTERICH.